Aug. 22, 1944. W. C. GRABAU 2,356,397
FREQUENCY AND VOLTAGE REGULATOR
Filed Aug. 6, 1941
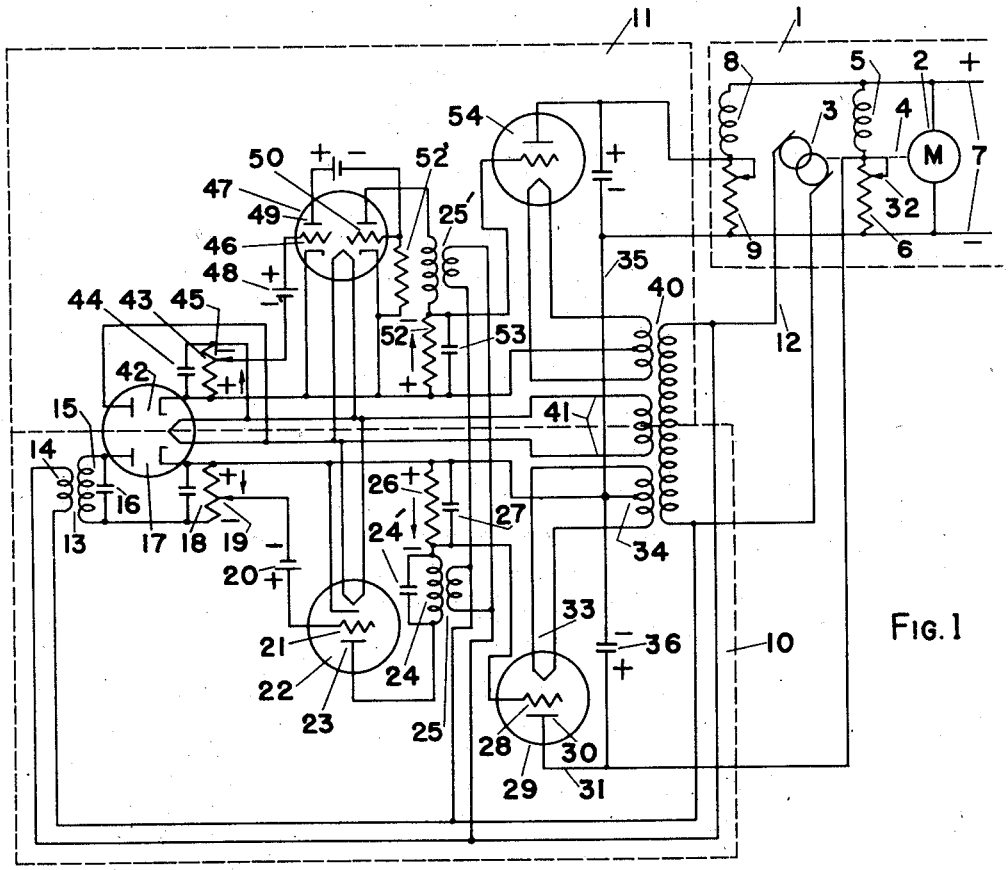
Fig. 1
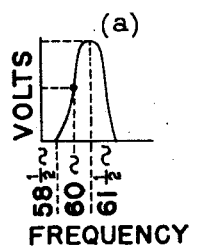
Fig. 2
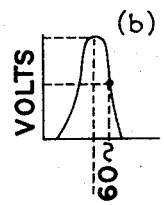
INVENTOR
William Christian Grabau
BY
his ATTORNEY Patented Aug. 22, 1944

2,356,397

UNITED STATES PATENT OFFICE 2,356,397

FREQUENCY AND VOLTAGE REGULATOR

William Christian Grabau, Brighton, Mass., assignor to Submarine Signal Company, Boston, Mass., a corporation of Maine Application August 6, 1941, Serial No. 405,652

5 Claims. (Cl. 171—119)

The present invention relates to a circuit for voltage and frequency regulation of an alternating current system and is particularly applicable for the control of voltage and frequency in large or small power supply systems over a comparatively wide range of both voltage and frequency. It is more particularly applicable to a motor generator system for voltage and frequency control wherein variations may occur both in the direct current supply voltage to the motor as well as in the load supplied from the generator.

In the present application both the voltage and frequency control are effected through the alternating current output source whose variations in voltage and frequency control elements supplying the correcting factors to maintain the voltage and frequency constant. In the control according to this system both voltage and frequency variations affect independent circuits, providing in themselves voltage variations on control tubes in which the frequency controlled voltage variation is made greater than the voltage controlled voltage variation so that frequency changes are more rapidly corrected than voltage changes.

It will be realized that to some extent voltage and frequency are interlocked with each other. This is particularly true when the system is operating under rather steady light load conditions. If under these circumstances the voltage to the motor supply source should decrease, both voltage and frequency will drop in substantially the same proportions and correction under these conditions is most positively obtained by speeding up the motor through a decrease in the motor field. On the other hand, under operating conditions where the load is increased on the generator end of the system, the frequency may be only slightly affected with considerable increase in the generator load and corresponding decrease in the output voltage. Under these conditions it is, of course, desirable to maintain the motor speed substantially constant and at the same time to increase the generator field so that the voltage is returned back to normal.

With this general operation as a basis, in the present system variations in frequency do not at all affect the voltage control and variations in voltage are made to have extremely little effect upon frequency variations. Variations in both voltage and frequency will, therefore, be independently corrected with the frequency corrections responding to a somewhat smaller variation than the voltage variations with the result that the frequency corrections will have the effect of modifying the voltage corrections whereas the voltage corrections will only slightly affect frequency changes. This feature prevents hunting in the system.

In order to gain a fuller understanding of the present invention, the invention will be described in the specification below in connection with the drawing in which Fig. 1 shows a circuit embodying the invention and Fig. 2 (a) and (b), shows a detail used in connection with the operation of the circuit in Fig. 1.

In Fig. 1, I may be considered the power supply source which is shown as a motor generator system with a motor 2 and generator 3 driven on the same shaft as indicated by the line 4. The motor may have a motor field 5 connected in series with a rheostat 6 across the direct current supply source 7 from which the power for the system is obtained. The generator 3 may also have a field 8 with a field rheostat 9 similar in construction to the rheostat 6, the elements 8 and 9 being connected across the direct current supply source. The current flowing through the motor field 5 is controlled by the frequency controlled circuit within the dotted-line enclosure 10, while the current flowing through the generator field 8 is controlled through the voltage control circuit within the dotted-line enclosure 11 in a manner which will be described below. Connected in shunt across the output leads 12 of the generator 3 is a transformer 13 the secondary of which has a 20 to 1 ratio with the primary 14 so that for the ordinary 120 volt alternating current system, the voltage delivered by the secondary will be 6 volts. The secondary 15 of the transformer is shunted by a condenser 16 across its ends to produce a resonant circuit whose characteristic curve is indicated in Fig. 2. The output of this circuit is impressed upon a rectifier tube 17 through a resistor 18 which has an adjustable potential tap 19 as a third connecting element. This third connecting element 19 is connected through a bias battery 20 to the grid 21 of a thermionic valve 22 to control the flow of current in the cathode-anode circuit of the tube 22 which comprises the anode 23, the secondary 24 of the transformer 25 and the resistor 26 by-passed by the condenser 27.

The flow of current in this plate circuit through the resistor 26 controls the potential of the grid 28 of the Thyratron tube 29. The anode 30 of this tube is connected by the lead 31 to a selected point 32 on the field rheostat 6 while the cathode 33 is connected through the mid-point tap 34 of the heating transformer by means of the lead 35 to the negative side of the supply line 7. This potential from anode to cathode, except for the variations in the flow of current through the field 5, is substantially constant for a given position of the rheostat tap. The control of this Thyratron tube is effected by the potential on the grid 28 as long as the tube is not firing. When the tube fires, however, the grid 28 loses control and this control is returned by the condenser 36, which, by its discharge, makes the potential from the cathode to the anode zero, or practically zero, momentarily thereafter extinguishing the arc in the tube and permitting the grid at that time to gain control. The effect, therefore, of this condenser in this arrangement eliminates the necessity of the use of any alternating current with its corresponding phase control relationships in order to permit the tube to go through a point of zero potential and thereby extinguishing itself. In this respect the condenser does not act as a supply source for the tube 29 or for any resonant circuit, but acts rather to lower the potential across the rheostat 6, since after discharge, it absorbs the power available from the direct current source, which power it dissipates in lowering the effective resistance of the Thyratron tube.

The tuned circuit comprising the secondary 15 of the transformer and the condenser 16 has a characteristic curve, as indicated in Fig. 2, in which the peak of the curve may correspond to a frequency of 61½ cycles, as indicated, and the lowest point of the curve corresponds to a frequency of 58½ cycles, as indicated, while the amplitude of the curve is preferably made to correspond approximately to 2 volts change. The point indicating at A on the ascending part of the resonant curve corresponds approximately to 60 cycles so that with a decrease of 1½ cycles, the voltage drop across the resonant circuit will equal one volt, while with an increase from the normal value of 60 cycles a 1½ cycle increase will correspond to one volt increase in the voltage generated by the resonant circuit. It is possible to use as a normal point of operation a point on the descending slope of the resonant curve, in which case the polarities of the various grids would be operated reversely. Since the transformer 13 has a voltage ratio of 20 to 1, a one volt variation in voltage across the primary circuit will only produce 1/20 of a volt variation in the resonant circuit so that the effect produced by the frequency variation of 1½ cycles is 20 times the effect produced by any voltage variation in the circuit and therefore the frequency correction will dominate. The voltage across the resistor 18 will likewise correspond to the voltage variations in the resonant circuit, and with an increase in voltage in the resistor 18, the grid 21 will become more negative, thus decreasing the flow of plate current in the plate circuit of the tube 22 and decreasing the bias on the grid 28 of the Thyratron tube 29, permitting the tube to discharge at such times. Thus, an increase in voltage resulting from a rise in frequency will break down and cause the tube 29 to discharge. The effect of this is, of course, to nullify partly the effect of the resistor 6 and to permit more current to flow through the field 5 so that the motor will not be compelled to turn as rapidly in order to generate its balancing electromotive force. The decrease in the motor's speed decreases the generator speed attached to the motor and thereby reduces the generator frequency. A decrease in frequency will act in the opposite direction, namely, that of sustaining the potential on the grid 28 of the Thyratron tube 29, thereby keeping the tube from discharging and limiting the current flowing through the field 5.

In the operation of this circuit the balance is so adjusted that the tube 29 will operate a portion of the time when the frequency is adjusted to 60 cycles. Under these conditions, therefore, when the frequency drops below 60 cycles, there is a tendency for the tube to discharge less and therefore for the motor to speed up so that the circuit operates to maintain the system in a centrally balanced position at the point of 60 cycles.

In the operation of the circuit just described the Thyratron tube 29 is entirely controlled by means of direct current. The voltage applied between the cathode and the anode of the tube is that obtained across the rheostat 6 from the point 32 to the negative side of the line. When the tube discharges because of the lowering of the negative bias on the grid, the effective resistance of the tube is further depressed by the discharging condenser 36, creating thereby practically a short circuit about the rheostat 6 and lowering the potential across the tube 29 to a point where the discharge is extinguished. The discharge of the tube brings with it an increase in current through the field 5. When the discharge ceases, the condenser again becomes charged through the direct current potential applied across its terminals in such a manner as indicated to make the anode positive and the cathode negative.

The voltage of the system, as has been stated, is controlled by means of a circuit within the enclosed line 11. With the generator rotor operating at a constant speed, an increase of current through the field 8 will increase the output voltage, other conditions being assumed the same. If the speed of the rotor should vary, both voltage and frequency will change. The frequency change has been discussed above. Bringing back the rotor to normal speed will, of course, bring back the voltage in a similar fashion. Since the voltage correction is made independently by means of the voltage circuit, there will be some interaction between the operation of the voltage and frequency circuits insofar, of course, as the change in frequency will produce a corresponding voltage change. The net result, however, is that insofar as the frequency change corrects the voltage in the system, less voltage change is needed from the voltage circuit and in any event the system operates to correct the net voltage change at any instant from the desired chosen value to bring the voltage back to this value. For this purpose there is employed a transformer 40 having a 20 to 1 ratio with a pair of secondary terminals 41 which acts to supply the heating current at 6 volts to the thermionic tube used in the system. This 6-volt system is impressed across a rectifier 42 which may be of the 6H6 type in series with a potentiometer 43 which is shunted by means of condenser 44. Unlike the frequency control circuit there is no tuning in this circuit. The negative drop obtained by means of the adjustable connection 45 on the potentiometer 43 is applied to the grid 46 of a vacuum tube 47 in series with a biasing battery 48. The plate 49 of this tube is connected to the second grid 50 in the same tube, which grid 50 is connected to the cathode by the resistor 52'.

In its output circuit of the tube 47 there is a resistor 52 in which the variation of potential drop controls the grid of the Thyratron 54. The tube 47 as well as the thermionic tube 22 has its plate supplied through a transformer connected to the alternating current source so that in effect they are operative only during the positive half cycle of the alternating current wave. The potential developed across the resistor 52 in the circuit 11 controls the operation of the Thyratron tube 54 in a fashion similar to that described for the tube 29. When the tube 54 suffers a decrease of grid bias, the tube will fire, thus permitting an increase of current flow through the field 8 and thereby raising the generated voltage. The negative bias on the tube 54 decreases with a decrease in current through the potentiometer 43 which decreases the bias on the grid 46 of the tube 47, thus increasing the bias on the grid 50 and decreasing the flow of plate current through the resistor 52 which lowers the bias on the grid of the tube 54. When the voltage across the input of the tube 42 increases, the current in the potentiometer 43 is increased and the potential on the grid of the Thyratron 54 prevents it from operating. As in the case of the frequency control circuit the system is adjusted so that for normal voltage conditions the Thyratron tube 54 will operate a portion of the time. Under this balance if the voltage in the system decreases, the tendency will be for the tube 54 to operate more frequently, while if the voltage increases, the tube 54 will operate less frequently, thus maintaining a point of equilibrium with a condition which might be considered the normal occurrence of the tube operation.

It should be noted that the transformers 25 and 25' in the output circuits of the tubes 22 and 47, respectively, are so connected that with a change in frequency or voltage, the resultant voltage at the secondaries of these transformers tends to aid in the effect to be produced on the grids of the Thyratrons 28 and 54. For this purpose, the secondary 24 of the transformer may be tuned by the condenser 24' similarly as the secondary 15 by the condenser 16. It should also be noted that the field resistors 6 and 9 may be omitted, in which case the tube itself acts as the resistance alone.

Having now described my invention, I claim:

1. Voltage and frequency regulating means for a power supply source comprising a motor generator each having independent field windings and field rheostats, independent voltage and frequency regulating circuits each having input elements including rectifier means for rectifying the alternating current impressed upon the input elements of said circuits and gaseous tube control means responsive to the rectified current for controlling respectively the current flowing through said field circuits, the input of said frequency circuit being tuned with normal operating conditions at one side of the resonant peak, and said frequency circuit producing a greater voltage change than said voltage circuit for the same percent variation in frequency as in voltage.

2. Voltage and frequency regulating means for a power supply source comprising a motor generator each having independent field windings and field rheostats, independent voltage and frequency regulating circuits each having input elements including rectifier means for rectifying the alternating current impressed upon the input elements of said circuits and gaseous tube control means responsive to the rectified current for controlling respectively the current flowing through said field circuits, the input of said frequency circuit being tuned with normal operating conditions at one side of the resonant peak, said frequency circuit dominating the voltage circuit in the control of constant operation.

3. A frequency regulation circuit for a power supply source having an input means operatively associated with the power source, rectifier means for rectifying the current of said input means, gaseous discharge control tube means positioned in said circuit and operatively associated with said rectifier means to effect changes in frequency, said gaseous discharge tube having anode, cathode and grid control electrodes with a direct current potential connected between the anode and cathode and the grid control being supplied with direct current through said rectifier and condenser means connected across from the anode to the cathode for returning control to said grid after said tube has discharged.

4. A frequency regulation circuit for the motor of a motor-generator set, said motor having a field winding and a field rheostat, a gaseous controlled tube having cathode, anode and grid control electrodes, said cathode-anode circuits being connected respectively across at least a portion of said field rheostat and condenser elements also connected across from said cathode to said anode for said tube and means for supplying to said grid of said gaseous control tube a direct current potential derived from the delivered alternating current, said means including a rectifier and a tuned circuit on which said alternating current is impressed, said tuned circuit having a point of resonance lying off of the resonant peak.

5. A frequency regulating circuit for a power supply source comprising an input means operatively associated with the power source, rectifier means for rectifying the current of said input means, a thermionic tube having cathode, anode and grid controlled electrodes positioned in said frequency circuit, said thermionic tube having its grid connected to said rectifier means and having its cathode-anode circuit energized through the alternating current source, gaseous tube discharge control means positioned in said circuit having grid electrodes connected in the output of said thermionic tube, said gaseous discharge tube also having anode and cathode electrodes, and condenser means connected from anode to the cathode whereby after said grid has effected a discharge of said tube, the discharge of said condenser extinguishes the arc in the tube, returning control to the grid for the next operation.

WILLIAM CHRISTIAN GRABAU.